US009625306B2

(12) United States Patent
Farley et al.

(10) Patent No.: US 9,625,306 B2
(45) Date of Patent: Apr. 18, 2017

(54) SYSTEM AND METHOD FOR CONVEYING AGRICULTURAL MATERIAL IN A HARVESTER

(71) Applicant: CNH Industrial America LLC, New Holland, PA (US)

(72) Inventors: Herbert M. Farley, Elizabethtown, PA (US); Jason M. Benes, Waverly, NE (US); Jonathan E. Ricketts, Coal Valley, IL (US); Rudy Vonck, Zedelgem (BE); Terry S. Moyer, Denver, PA (US); Jason L. Shonk, Lancaster, PA (US); Victor C. D. Demaecker, Zeuienkerke (BE); John J. Borsdorf, LeClaire, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/733,667

(22) Filed: Jun. 8, 2015

(65) Prior Publication Data
US 2015/0276469 A1  Oct. 1, 2015

Related U.S. Application Data

(62) Division of application No. 13/679,186, filed on Nov. 16, 2012, now Pat. No. 9,078,397.

(51) Int. Cl.
*A01D 41/00* (2006.01)
*G01G 11/02* (2006.01)
*A01F 12/44* (2006.01)
*A01F 12/58* (2006.01)
*A01F 7/02* (2006.01)
*A01F 12/00* (2006.01)
(Continued)

(52) U.S. Cl.
CPC ............. *G01G 11/02* (2013.01); *A01D 41/12* (2013.01); *A01F 7/02* (2013.01); *A01F 12/00* (2013.01); *A01F 12/44* (2013.01); *A01F 12/442* (2013.01); *A01F 12/46* (2013.01); *A01F 12/58* (2013.01)

(58) Field of Classification Search
CPC ............. A01D 41/127; A01D 41/1273; A01D 41/1276; A01D 41/12; A01F 12/44; A01F 12/48; A01F 7/02; A01F 12/00; A01F 12/46; A01F 12/442; G01G 11/02
USPC ................. 56/10.2 C, 10.2 R; 73/12.11, 579; 209/599; 460/2, 4, 22, 45; 701/50
See application file for complete search history.

(56) References Cited

U.S. PATENT DOCUMENTS 3,602,230 A   8/1971  Knapp
3,613,691 A   10/1971 Wilshusen
(Continued)

FOREIGN PATENT DOCUMENTS

WO   8502315   6/1985
WO   8502316   6/1985
WO   8800432   1/1988

*Primary Examiner* — Robert Pezzuto
(74) *Attorney, Agent, or Firm* — Patrick M. Sheldrake

(57) ABSTRACT

A system and method for conveying agricultural material in a harvester. One harvester includes a rotor which rotates to separate a plant into a first agricultural material and a second agricultural material. A grate is disposed vertically below the rotor and further separates the first and second agricultural materials from one another. A first conveyor receives the first and second agricultural material directly from a trailing end of the rotor and a trailing end of the grate.

8 Claims, 4 Drawing Sheets

US 9,625,306 B2
Page 2

(51) Int. Cl.
*A01F 12/46* (2006.01)
*A01D 41/12* (2006.01)

(56) References Cited

U.S. PATENT DOCUMENTS

| | | |
|---|---|---|
| 3,616,800 A | 11/1971 | Rowland-Hill et al. |
| 3,742,686 A | 7/1973 | Rowland-Hill |
| 4,943,260 A | 7/1990 | Fossum |
| 5,873,226 A | 2/1999 | McLeod |
| 6,283,853 B1 | 9/2001 | Pellenc et al. |
| 7,066,810 B2 | 6/2006 | Farley et al. |
| 7,211,745 B1 | 5/2007 | Brown et a |
| 7,520,115 B2 | 4/2009 | Coers et al. |
| 7,584,663 B2 * | 9/2009 | Missotten .......... A01D 41/1273 209/599 |
| 7,630,809 B2 * | 12/2009 | Behnke ................ A01D 41/127 56/10.2 R |
| 7,670,218 B2 * | 3/2010 | Behnke .............. A01D 41/1276 460/4 |
| 7,937,923 B2 | 5/2011 | Biziorek |
| 7,950,989 B2 | 5/2011 | Dow et al. |
| 2003/0076118 A1 | 4/2003 | Adams et al. |
| 2006/0046801 A1 | 3/2006 | Argetsinger et al. |
| 2006/0128451 A1 | 6/2006 | Ricketts |
| 2006/0246966 A1 | 11/2006 | Smith |
| 2007/0161422 A1 | 7/2007 | Behnke et al. |
| 2007/0270200 A1 | 11/2007 | Smith |
| 2009/0019826 A1 | 1/2009 | Rigney |
| 2010/0217481 A1 | 8/2010 | Baumgarten et al. |
| 2010/0291981 A1 | 11/2010 | Ricketts et al. |
| 2013/0029734 A1 | 1/2013 | Behnke et al. |

* cited by examiner

US 9,625,306 B2

SYSTEM AND METHOD FOR CONVEYING AGRICULTURAL MATERIAL IN A HARVESTER

This divisional application claims priority under 35 U.S.C. §120 from co-pending U.S. patent application Ser. No. 13/679,186 filed on Nov. 16, 2012 by Herbert M. Farley, Jason M. Benes, Jonathan E. Ricketts, Rudy Vonck, Terry S. Moyer, Jason L. Shonk, Victor C. D. Demaecker and John J. Borsdof with the same title, the full disclosure of which is hereby incorporated by reference.

BACKGROUND

The invention relates generally to agricultural equipment, such as harvesters, and more specifically, to a system and method for conveying agricultural material in a harvester.

A harvester may be used to harvest agricultural crops, such as barley, beans, beets, carrots, corn, cotton, flax, oats, potatoes, rye, soybeans, wheat, or other plant crops. Moreover, a combine (e.g., combine harvester) is a type of harvester generally used to harvest grains (e.g., barley, corn, flax, oats, rye, soybeans, wheat, etc.). Accordingly, a combine may be used to separate a plant into different agricultural materials, such as grain and straw. During operation of a combine, the harvesting process begins by removing the plant from the ground, usually using a cutting device. The combine then separates the plant into two agricultural materials by generally directing the grain to a cleaning system and the straw toward a beater. The beater directs the straw toward a pan to further separate grain from the straw. In some combines, the cleaning system includes multiple vibrating sieves that isolate the grain from the other agricultural material and a blower that blows the agricultural material away from the grain.

Unfortunately, the beater/pan configuration may reduce harvesting efficiency. For example, the beater is heavy and may weigh between 300 and 400 lbs. Furthermore, the pan, placed below the beater, is curved to accommodate the beater and may restrict airflow from the blower. The blower is responsible for separating certain agricultural material (e.g., straw) from the grain. As such, the restricted airflow resulting from the pan may reduce cleaning efficiency, which may result in increased time and expense for harvesting. Furthermore, in certain combines it may be beneficial to know the amount of agricultural material being harvested by the combine while the harvester is in operation in order to adjust the harvesting process for optimal grain recovery.

BRIEF DESCRIPTION

In one embodiment, a harvester includes a rotor which rotates to separate a plant into a first agricultural material and a second agricultural material. A grate is disposed vertically below the rotor and further separates the first and second agricultural materials from one another. A first conveyor receives the first and second agricultural material directly from a trailing end of the rotor and a trailing end of the grate.

In another embodiment, a harvester includes a conveyor to receive an agricultural material, wherein the conveyor has a sensor configured to measure a weight of the agricultural material. The conveyor also has control circuitry configured to receive a signal indicative of the measured weight from the sensor.

In a further embodiment, a method for determining a total amount of agricultural material harvested by a harvester includes measuring a first weight of the agricultural material while the agricultural material is conveyed by a first conveyor of the harvester during a first time period. A second weight of the agricultural material is measured while the agricultural material is conveyed by the second conveyor during a second time period. Further, in the method, the total amount of agricultural material harvested by the harvester is calculated, based at least partially on the first weight and the second weight.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
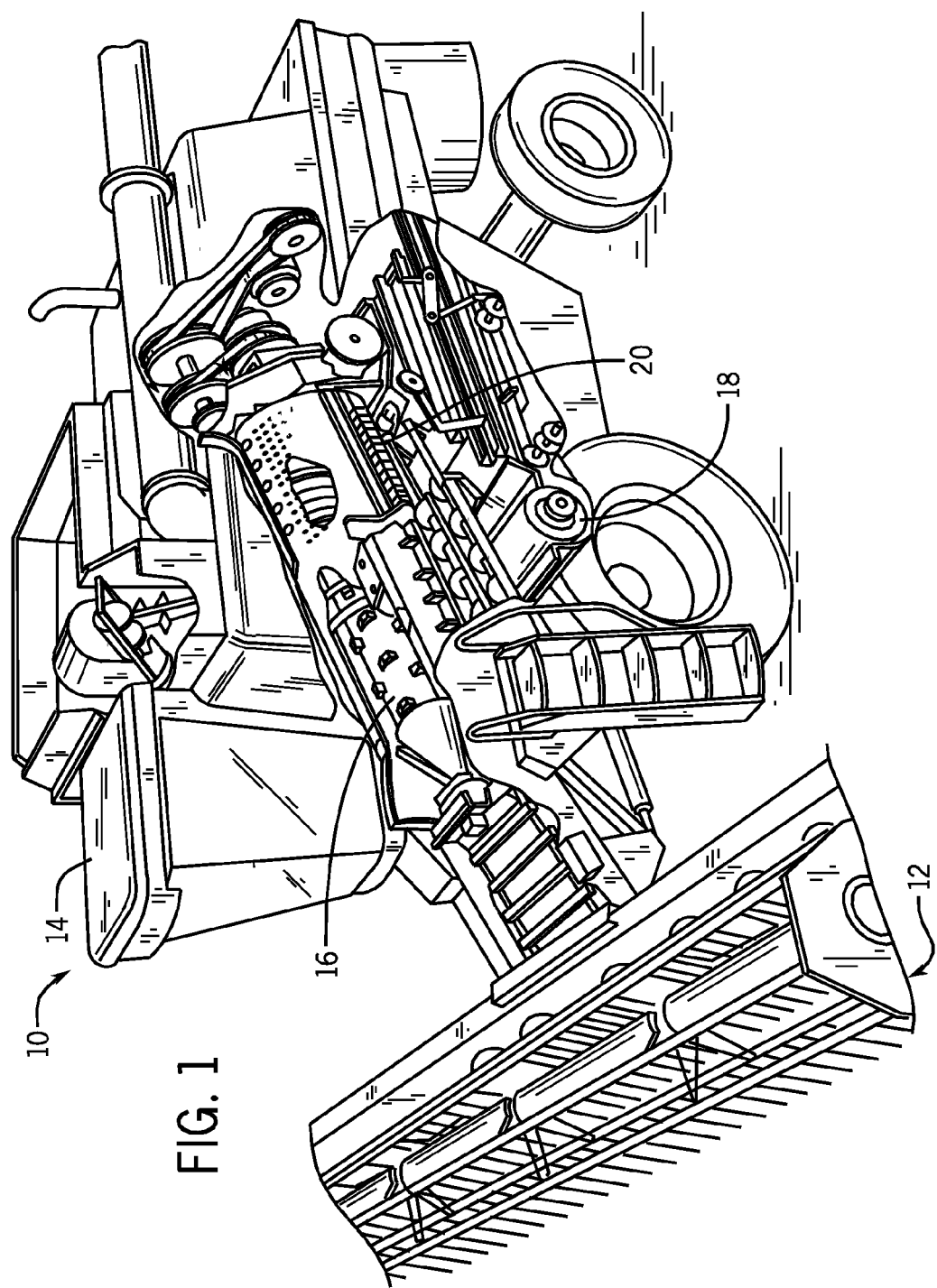
FIG. 1 is a perspective view of an embodiment of a harvester which may employ a conveyor for conveying agricultural material.

Turning now to the drawings, FIG. 1 is a perspective view of a harvester 10 (e.g., combine) which may employ a conveyor for conveying agricultural material. The harvester 10 may be configured to harvest grains such as barley, corn, flax, oats, rye, soybeans, wheat, and so forth. Accordingly, the harvester 10 is configured to remove plants from the ground and to separate the plants into a first agricultural material and a second agricultural material, for example, grain and straw. The harvester 10 includes various systems that are used during harvesting. To improve the efficiency of the harvester 10, a separation system of the harvester 10 may enhance airflow by allowing a larger clearance within the separating system. Furthermore, the harvester 10 may include a conveyor that conveys harvested grain while determining a mass of the harvested grain.

The harvesting process begins with the harvester 10 using a cutting assembly 12 to remove plants from soil. An operator of the harvester 10 may be seated in a cab 14, and the operator may monitor the operation of the cutting assembly 12 and other systems of the harvester 10. After removing the plants, the harvester 10 transports the plants to a rotor 16. The rotor 16 rotates to separate the grain of the plants from the straw of the plants. Specifically, the rotor 16 has multiple projections on its surface that interact with the plants to facilitate separation of the grain from the straw. Grain is directed from the rotor 16 further into a cleaning system 20. The cleaning system 20 is designed to further separate the grain from agricultural material removed with the grain (e.g., straw, soil, etc.) using a blower 18.

Figure 2:
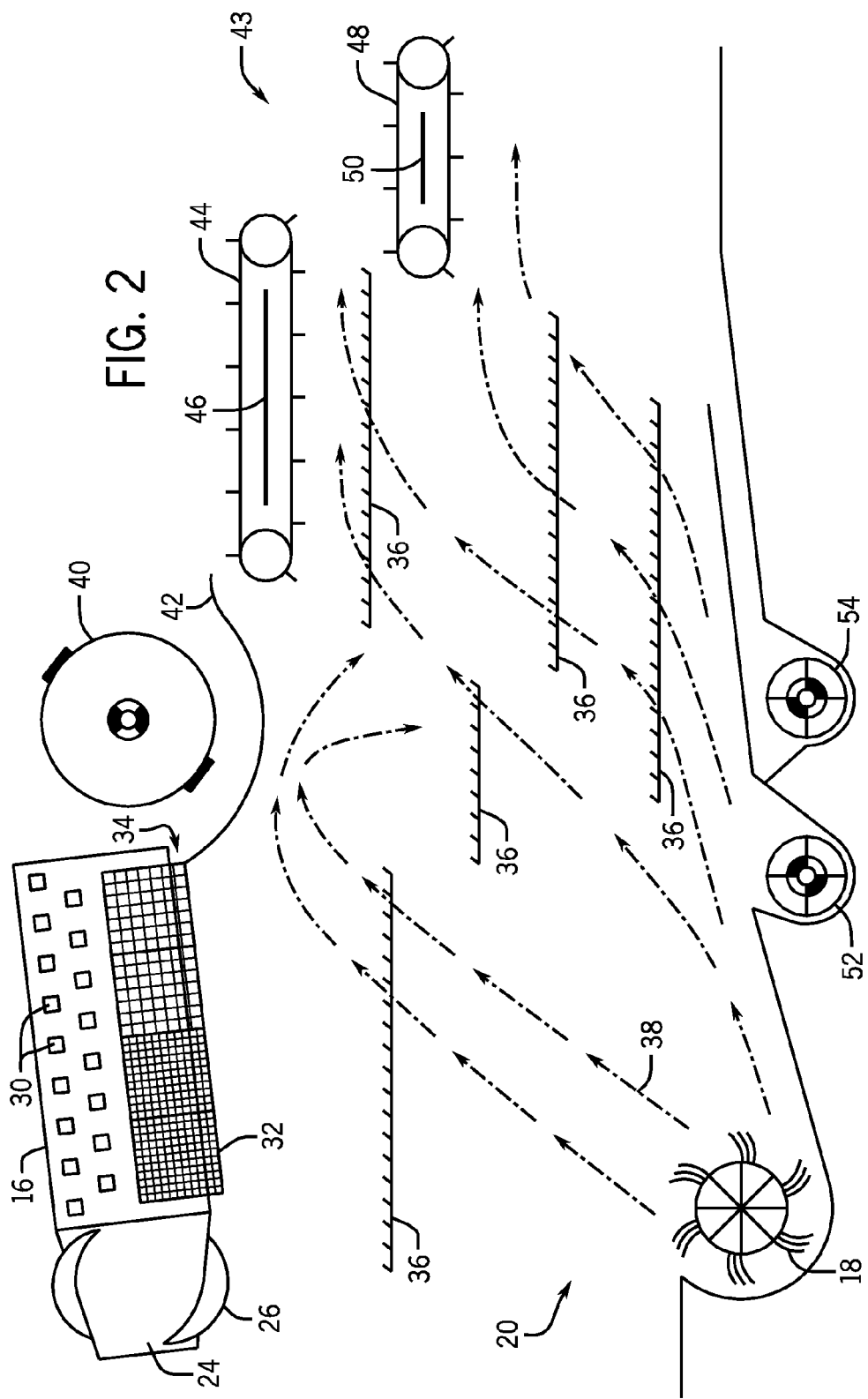
FIG. 2 is a schematic diagram of an embodiment of a harvester configured to separate a plant into a first agricultural material and a second agricultural material.

FIG. 2 is a schematic diagram of an embodiment of a system configured to separate a plant into a first agricultural material and a second agricultural material. After plants are removed from the soil, the plants are directed toward a conical end 24 of the rotor 16. The conical end 24 includes blades 26 that direct the plants toward a main body portion 28 of the rotor 16. The main body portion 28 includes projections 30 that direct the plants toward a grate 32 positioned vertically below the rotor 16. As illustrated, the grate 32 has openings that enable grain to pass through the grate 32 while blocking chaff from passing through the grate 32, thus facilitating separation of the plants into grain and chaff. As the rotor 16 rotates, the rotor 16 directs the plants against the grate 32 which may frictionally separate the grain from the chaff. While the grain falls through the grate 32 and enters the cleaning system 20, the chaff is directed along the rotor 16 and the grate 32 toward a trailing end 34 of the rotor 16 and the grate 32. As may be appreciated, some grain may not pass through the openings in the grate 32 and may move with the chaff out of the trailing end 34 of the rotor 16. Furthermore, some chaff may pass through the grate 32 with the grain and may enter the cleaning system 20.

The grain that falls through the grate 32 drops onto a series of sieves 36. The sieves 36 vibrate and shake the grain to further separate chaff and other agricultural material from the grain. To aid in separating the agricultural materials, the blower 18 directs an airflow 38 upward through the sieves 36. The airflow 38 blows off the chaff upwardly, thereby leaving the grain to travel through the series of sieves 36. While five sieves 36 are illustrated in FIG. 2, any suitable number of sieves 36 may be used in alternative embodiments.

When the chaff exits the trailing end 34 of the rotor 16, the chaff contacts a beater 40 and a beater pan 42. The beater 40 may be formed from heavy material. The weight of the beater 40 combined with the shape of the beater pan 42 may drive the chaff and residual grain toward a conveyor system 43. The conveyor system 43 includes a first conveyor 44 to convey agricultural material from the trailing end 34. Moreover, the first conveyor 44 includes a first sensor 46 configured to measure a weight of the agricultural material on the first conveyor 44. As may be appreciated, the first sensor 46 may be configured to measure a weight, a volume, or any other suitable property of the agricultural material. The first sensor 46 may provide the measured weight to a control system. The control system may use the measured weight to calculate information corresponding to harvesting plants, such as for producing yield maps, determining throughput, and calculating a harvesting rate. The first conveyor 44 may direct the agricultural material toward the sieves 36, a second conveyor 48, or to another location. As may be appreciated, the airflow 38 from the blower 18 may impact agricultural material being conveyed by the conveyors 44 and 48 (e.g., to separate chaff from grain).

The second conveyor 48 may include a second sensor 50. Similar to the first sensor 46, the second sensor 50 is configured to measure a weight of agricultural material. Furthermore, the second sensor 50 may be configured to measure a weight, a volume, or any other suitable property of the agricultural material disposed thereon. The second sensor 50 may provide the measured weight to a control system. The control system may use the weight to calculate information corresponding to harvesting plants, such as calculations corresponding to revenue and productivity. The second conveyor 48 may direct the agricultural material toward the sieves 36 or to another location. Although the depicted embodiment includes only one sensor 46 in the first conveyor 44, and only one sensor 50 in the second conveyor 48, the conveyors 44 and 48 may contain any number of sensors in other embodiments. Having the sensors 46 and 50 integrated with the cleaning system 20 may enable the operator to optimize the performance of the harvester 10 during the harvesting process, thereby improving harvester efficiency, reducing waste generation, and increasing revenue from the harvesting operation. Additionally, performing operation calculations during the harvesting process may save time by obviating post-harvest calculations.

After being moved by the conveyors 44 and 48 and/or the series of sieves 36, the agricultural material is directed toward a first auger 52 (e.g., clean grain cross auger), toward a second auger 54 (e.g., tailings cross auger), outside of the harvester, or elsewhere. The first auger 52 may be used to convey clean grain to a clean grain elevator, while the second auger 54 may be used to convey tailings to a tailings return system.

Figure 3:
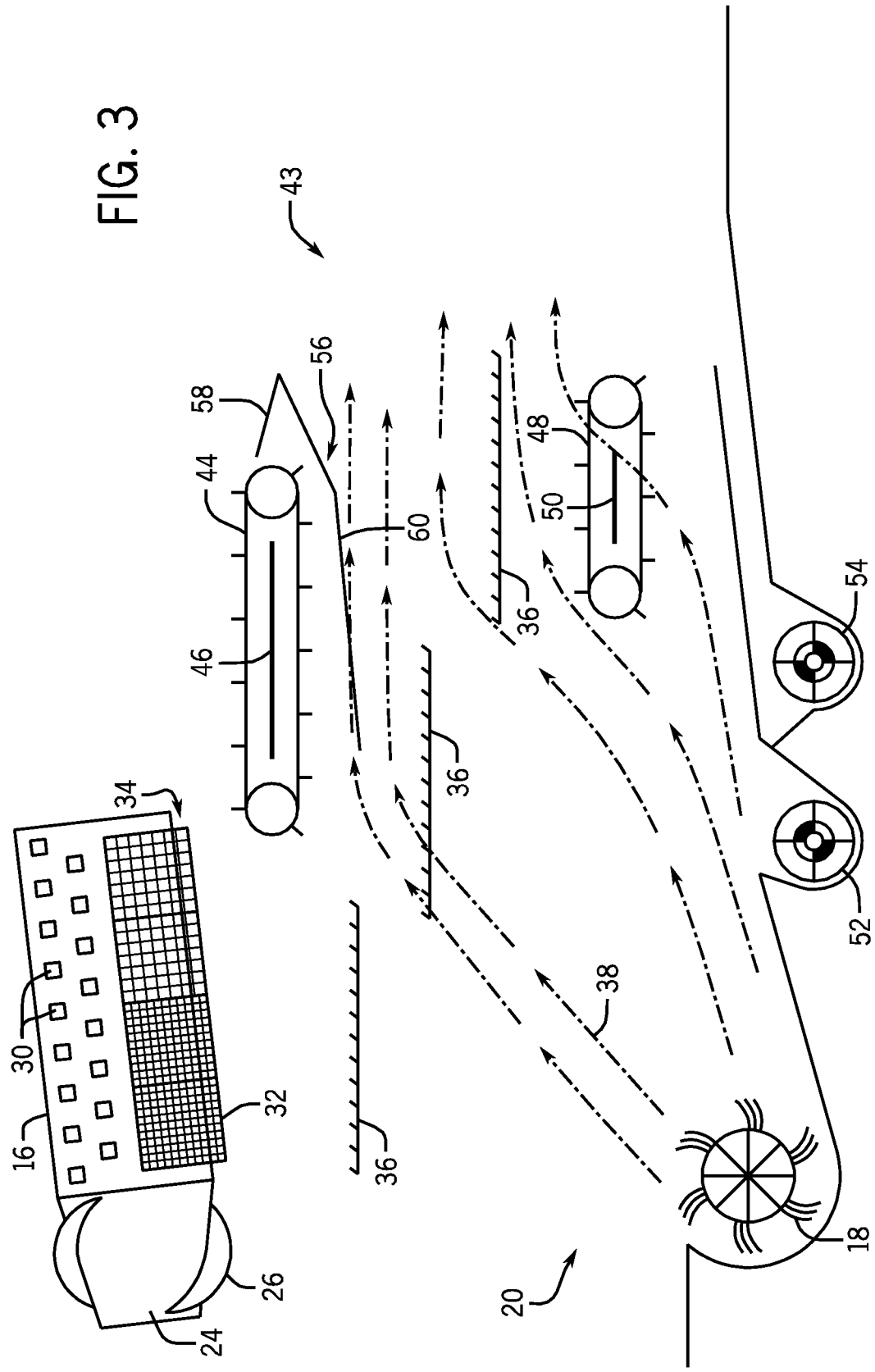
FIG. 3 is a schematic diagram of another embodiment of a harvester configured to separate a plant into a first agricultural material and a second agricultural material.

FIG. 3 is a schematic diagram of another embodiment of a harvester 10 configured to separate a plant into a first agricultural material and a second agricultural material. As illustrated, the arrangement of the conveyor system 43 directs the airflow 38 in a desired manner, thereby improving the efficiency of the cleaning system 20. In the present embodiment, as the chaff exits the trailing end 34 of the rotor 16, the chaff drops directly onto the first conveyor 44 which contains the first sensor 46. As discussed previously, the first sensor 46 may measure the weight of the material on the first conveyor 44. As may be appreciated, the airflow 38 may direct chaff off of the first conveyor 44 so that mostly residual grain remains on the first conveyor 44. Accordingly, the first conveyor 44 may direct the residual grain toward a residual capture system 56.

The residual capture system 56 includes a perforated surface 58 (e.g., perforated pan) to separate the residual grain from other agricultural materials. In certain embodiments, the perforated surface 58 may operate similarly to the sieves 36 (e.g., by shaking). Furthermore, the residual capture system 56 has a redirecting mechanism 60 (e.g., ramp) configured to direct the recovered grain toward a beginning stage of the cleaning system 20. During operation of the first conveyor 44, the first conveyor 44 may direct the residual grain onto the perforated surface 58. The perforations may enable the residual grain to drop onto the redirecting mechanism 60 while blocking other agricultural materials from dropping onto the redirecting mechanism 60.

As illustrated in FIG. 2, the beater pan 42 of the other embodiment may project into the pathway of the airflow 38 causing the airflow 38 to be redirected downwardly. When redirected downwardly, the airflow 38 may not move as desired. Furthermore, the redirected airflow 38 may interrupt the cleaning process by blowing the chaff toward the sieves 36. The interruption to the cleaning process may result in wasted agricultural material, inadequate cleaning, and/or wasted time. Alternatively, as illustrated in FIG. 3, the present embodiment of the harvester 10 does not include the beater 40 and the beater pan 42. Omission of the beater 40 and the beater pan 42 may result in a weight reduction and/or cost reduction of the harvester 10. For example, reducing the weight of the harvester 10 may improve fuel efficiency and may increase harvester 10 operation speed. Additionally, omission of the beater 40 and the beater pan 42 may improve the effectiveness of the airflow 38 from the blower 18. With the beater pan 42 omitted, the path for the airflow 38 may have sufficient clearance between the cleaning system 20 and the first conveyor 44 so that the airflow 38 is not redirected. As in this embodiment, the cleaning system 20 and the first conveyor 44 may be oriented generally parallel to each other, enabling a suitable clearance for the airflow 38. By removing blockages to the airflow 38, the airflow 38 may more effectively separate the grain and the chaff. Accordingly, the airflow 38 may pass through the sieves 36 to remove the chaff without the chaff being redirected toward the sieves 36.

Furthermore, the addition of the residual capture system 56 may improve the separation efficiency of the cleaning system 20. Instead of dropping the residual grain from the first conveyor 44 into a middle portion of the cleaning system 20, the residual capture system 56 directs the residual grain toward a beginning stage of the cleaning system 20. The perforated surface 58 functions similarly to the grate 32 by enabling residual grain to fall through the perforations, while blocking chaff from falling through the perforations. The chaff may then be removed by the airflow 38. The improved separation efficiency of the harvester 10 may result in increased revenue and more accurate yield predictions for future harvests.

Figure 4:
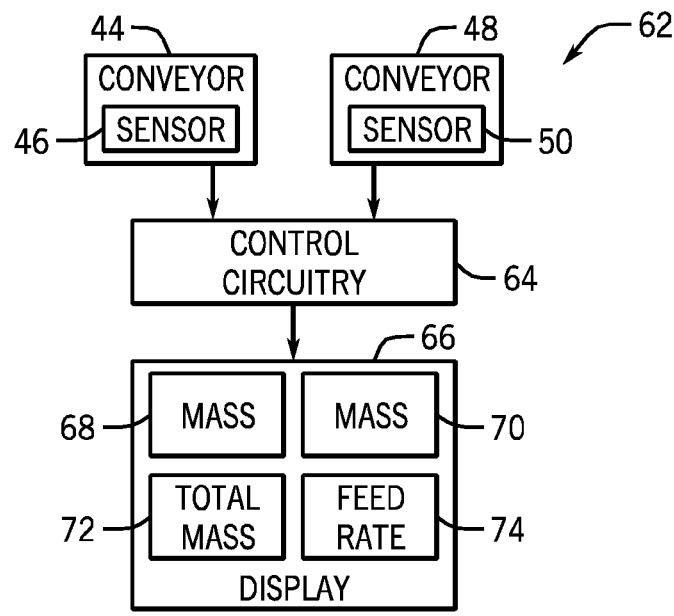
FIG. 4 is a block diagram of an embodiment of a harvester control system.

FIG. 4 is a block diagram of an embodiment of a harvester control system 62. As may be appreciated, the control system 62 may be located within the cab 14, or at another location of the harvester 10. The control system 62 includes control circuitry 64 configured to receive and to process data from the sensors 46 and 50. In certain embodiments, the control circuitry 64 may be configured to calculate a total weight of agricultural material conveyed by the first conveyor 44 and/or the second conveyor 48. The control system 62 also includes a display 66 configured to present information to an operator of the harvester 10. The first sensor 46 of the first conveyor 44 may measure a weight of the agricultural material on the first conveyor 44. Similarly, the second sensor 50 of the second conveyor 48 may measure a weight from the agricultural material on the second conveyor 48. The measured weights may be provided to the control circuitry 64. The control circuitry 64 may use the measured weights to determine information about the agricultural material on the conveyors 44 and 48 (e.g., mass/volume of the agricultural material). The resultant information from the measured weights may be presented to the operator of the harvester 10 via a display 66. For example, the display 66 may show a first weight 68 of agricultural material on the first conveyor 44, a second weight 70 of agricultural material on the second conveyor 48, a total mass 72, and a feed rate 74.

In other embodiments, the display 66 may provide other information such as yield projections, revenue estimates, energy usage, volume harvested, total time harvesting, harvest rate, time, date, temperature, or any other data useful to the operator. In the present embodiment, the conveyors 44 and 48 each house only one sensor. However, in other embodiments, the harvester 10 may include any number of conveyors and any number of sensors. For example, the first conveyor 44 may include three sensors, the second conveyor 50 may include two sensors, and a third conveyor may include five sensors. The sensors 46 and 50 may be any suitable sensor, such as a pressure transducer, load cell, piezoelectric sensor, accelerometer, strain gauge, or infrared sensor. Having the sensors 46 and 50 integrated with the cleaning system 20 may enable the operator to adjust performance parameters of the harvester 10 during the harvesting process instead of waiting until the next harvest to adjust operation. Real-time/near real-time adjustment of operating parameters may result in improved separation efficiency, improved energy efficiency, and increased revenue from the overall harvesting operation. Additionally, performing operation calculations while harvesting may save time by obviating post-harvest calculations.

Figure 5:
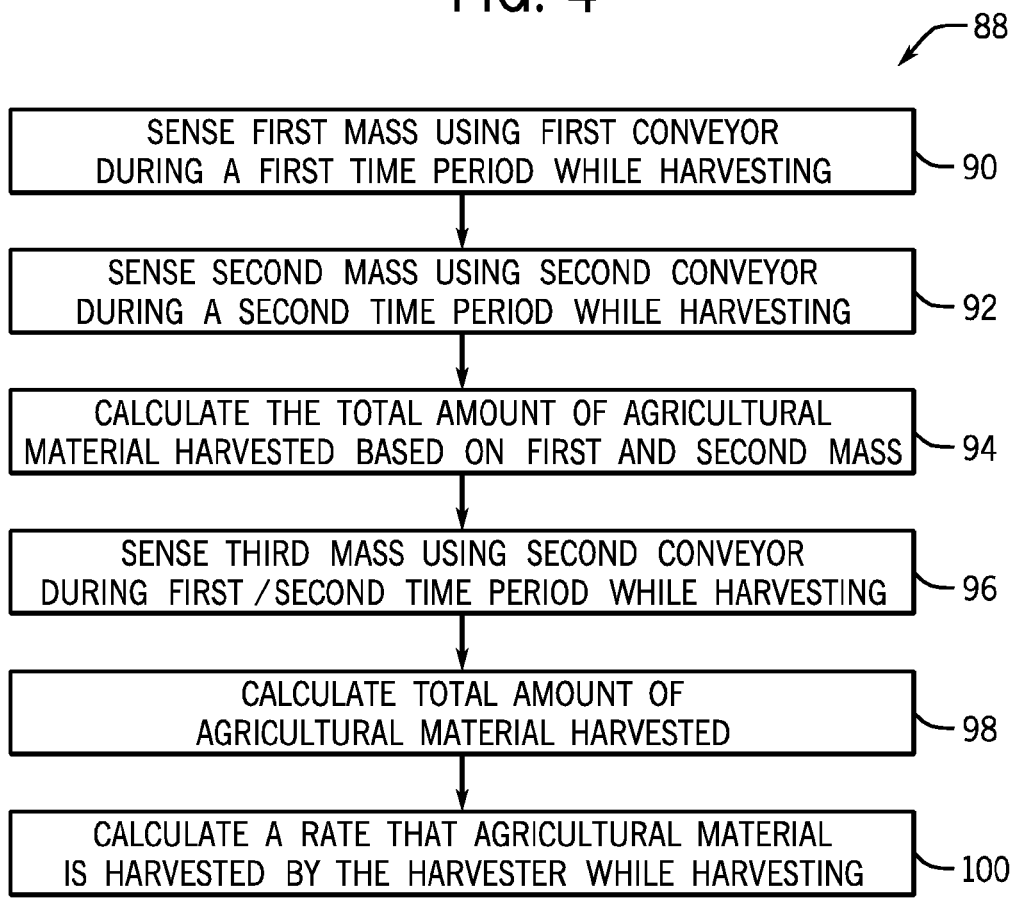
FIG. 5 is a flowchart of an embodiment of a method for determining a total amount of agricultural material harvested by a harvester.

FIG. 5 is a flowchart of an embodiment of a method 88 for determining a total amount of agricultural material harvested by a harvester 10. The method 88 includes measuring the first weight 68 using the first sensor 46 of the first conveyor 44 during a first time period while the harvester 10 is harvesting (block 90). The first sensor 46 may be a scale, a load cell, a strain gauge, or any other suitable sensor. Additionally, the first conveyor 44 may contain multiple sensors to determine a variety of information about the material on the first conveyor 44. Similarly, the second conveyor 48 may measure the second weight 70 during a second time period using the second sensor 50 of the second conveyor 48 while the harvester 10 is harvesting (block 92). The second conveyor 48 may house multiple sensors that may be used to determine a variety of information about the material on the second conveyor 48. For example, the sensors within the first conveyor 44 and the second conveyor 48 may measure data corresponding to mass, weight, volume, density, moisture content, or any other information beneficial to the operator. Based on the first and second weights 68 and 70 measured by the first and second sensors 46 and 50, the total weight 72 of agricultural material harvested by the harvester 10 may be calculated (block 94). The first weight 68, the second weight 70, and the total weight 72 may be presented on the display 66 for the operator. This information may be used to estimate additional information such as revenue, losses, and/or annual productivity. The harvester 10 may also measure a third weight during the first or second time period using the second conveyor 48 (block 96). For example, during the first time period, the first conveyor 44 may measure a first weight 68, and the second conveyor may measure a second weight 70. In the following second time period, the first conveyor may measure a third weight, and the second conveyor may measure an additional weight, and so on. In this way, near real-time measurements may be approximated.

Using the method 88, the harvester 10 may be able to convey relevant data to an operator in a timelier manner. Using the third weight and any additional weight measurements, the total amount of agricultural material may be recalculated (block 98). Furthermore, the rate that agricultural material is harvested may be calculated while the harvester 10 is harvesting (block 100). The method 88 may provide information to the user about harvesting efficiency, equipment functionality, and/or crop productivity during operation of the harvester. The harvester 10 may also be capable of generating yield maps and yield production data based on multiple data sets from multiple harvests.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for determining a total amount of agricultural material harvested by a harvester, comprising:
measuring with a first sensor connected to a first conveyer a first weight of the agricultural material while the agricultural material is conveyed by the first conveyor of the harvester during a first time period after the agricultural material has exited a rotating threshing system of the harvester;
measuring with a second sensor connected to a second conveyer a second weight of the agricultural material while the agricultural material is conveyed by the second conveyor during a second time period; the second conveyor positioned and configured to receive the agricultural material at least from a cleaning system comprising a sieve, the cleaning system positioned to receive crop material that has exited the threshing system; and calculating with a control system connected to the first and second sensor the total amount of agricultural material harvested by the harvester based at least partially on the first weight and the second weight.

2. The method of claim 1, wherein measuring the first weight of the agricultural material comprises measuring the first weight of the agricultural material while the harvester is harvesting the agricultural material.

3. The method of claim 1, comprising measuring a third weight of the agricultural material while the agricultural material is conveyed by the second conveyor, downstream from the first conveyor, during the first time period, the second time, or a combination thereof.

4. The method of claim 3, comprising determining the total amount of agricultural material harvested by the harvester based at least partially on the third weight.

5. The method of claim 1, comprising determining a harvesting rate of the agricultural material based at least partially on the first weight, the second weight, the first time period, the second time period, or a combination thereof.

6. The method of claim 1, wherein the control system comprises control circuitry and the control circuitry is operably connected to the first and second sensors and configured for determining the total amount of agricultural material harvested at least partially from the first weight and the second weight.

7. The method of claim 1, wherein the rotating threshing system comprises a rotor configured to rotate to separate a plant into a first agricultural material and a second agricultural material;

a grate disposed vertically below the rotor and configured to further separate the first and second agricultural materials from one another; and the first conveyor is configured to receive the first and second agricultural material directly from a trailing end of the rotor and a trailing end of the grate.

8. The method of claim 1, wherein the first and second conveyers rearwardly convey the agricultural material.

* * * * *